United States Patent
Akiyama et al.

(10) Patent No.: US 7,397,609 B2
(45) Date of Patent: Jul. 8, 2008

(54) IMAGING APPARATUS

(75) Inventors: Hideki Akiyama, Fujisawa (JP); Peter Labaziewicz, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/410,970

(22) Filed: Apr. 25, 2006

(65) Prior Publication Data

US 2007/0120988 A1    May 31, 2007

(30) Foreign Application Priority Data

Nov. 29, 2005   (JP)   ............... 2005-344624

(51) Int. Cl.
G02B 15/14    (2006.01)
G03B 17/00    (2006.01)
H04N 5/262    (2006.01)

(52) U.S. Cl. .................. 359/676; 359/698; 396/60; 348/240.1

(58) Field of Classification Search .......... 359/697, 359/698, 676, 666; 396/60, 72, 311, 85–87, 396/263; 348/231.3, 231.99, 239, 240.1, 348/207.99, 231.33, 369
See application file for complete search history.

(56) References Cited

U.S. PATENT DOCUMENTS

| 6,731,339 | B2 * | 5/2004 | Ohkawara | 348/347 |
| 6,757,013 | B2 * | 6/2004 | Matsuzaka | 348/240.1 |
| 6,947,074 | B2 * | 9/2005 | Koseki et al. | 348/240.1 |
| 7,110,185 | B2 * | 9/2006 | Saori | 359/666 |

FOREIGN PATENT DOCUMENTS

| JP | 80-18842 | 1/1996 |
| JP | 100-42183 | 2/1998 |
| JP | 2003-283910 | 10/2003 |

* cited by examiner

*Primary Examiner*—Mohammed Hasan
(74) *Attorney, Agent, or Firm*—Thomas J. Strouse (57) ABSTRACT

An imaging apparatus suppresses deterioration in an image quality caused by an electronic zoom. A digital camera equipped with a plurality of optical systems includes a fixed focal distance lens and a zoom lens. When a user sets a zoom position between discrete optical zoom positions within an overlapping range of the electronic zoom range of the fixed focal distance lens and the optical zoom range of the zoom lens, a control processor and timing generator sets the electronic zoom at the user's setting zoom position. Subsequently, when the zoom position of the zoom lens passes the user's setting zoom position, a photograph is taken, and an optical zoom image is stored in a memory card.

12 Claims, 10 Drawing Sheets

IMAGING APPARATUS

FIELD OF THE INVENTION

The present invention generally relates to an imaging apparatus such as a digital camera, and more particularly to an imaging apparatus equipped with one or more optical systems for photographing a scene.

BACKGROUND OF THE INVENTION

Many digital cameras are currently equipped with a zoom lens and a single image sensor to photograph still images and moving images. A photographed image is digitally processed to generate a digital image file, and the generated digital image file is stored in a memory in the digital camera. The digital image file is next transferred to a computer to be displayed thereon, or is transferred to a printer to be printed.

Preferable specifications for a digital camera are to be small in size and large in optical zoom range. A user prefers a large zoom range to a limited zoom range. However, when a digital camera is equipped with a large zoom range lens without sacrificing image quality of a photographed image, the digital camera increases in size. In an expensive camera such as an optical single-lens reflex camera, it is possible to use a plurality of interchangeable lenses such as a 28 mm-70 mm zoom lens and a 70 mm-210 mm zoom lens. However, such interchangeable lenses are inconvenient for a user using a compact digital camera.

Some digital cameras use a single lens and a plurality of image sensors for generating a color image. Light from a subject is split by a prism beam splitter into a plurality of colors to be used for a plurality of monochrome image sensors to image R, G and B color images.

Moreover, conventionally, a stereo film camera and a stereo digital camera have been also known. These cameras have two lenses having the same focal distance and being arranged separately in the horizontal direction, and form two images of scenes that slightly differ from each other, in two frames of a film or two imaging sensors. The two images constitute the so-called stereo pair. The two lenses are designed to have the same magnifying power, and are used simultaneously in order to form, on the image sensors, the images for the left eye and the right eye for obtaining a stereo effect.

In a compact digital camera, in order to obtain a large zoom range without taking any time for interchanging lenses, it is suitable to mount a plurality of lenses having different focal distances to use them appropriately according to zoom positions. However, for example, in the case where two lenses having different focal distances are mounted in a camera, how each focal distance is set and how the two lenses are changed become important. A digital camera can have both an optical zoom function, and an electronic zoom function which can electronically zoom the digital image data.

Moreover, in a digital camera, when the optical zoom function can provide a zoom position which a user has set, only the optical zoom is executed; in contrast, when the optical zoom function is insufficient, the electronic zoom is executed to a distance beyond the maximum focal distance of the optical zoom. However, in the case where the optical zoom is driven stepwise or discretely, using the electronic zoom function to interpolate within the gaps between the zoom positions obtained by the optical zoom has been proposed.

Japanese Patent Laid-Open Publication No. Hei 10-42183 states that a camera equipped with a single lens and a single image sensor drives the electronic zoom and the optical zoom to determine an angle of view, and increases the ratio of the optical zoom while maintaining the angle of view.

Moreover, in relation to a camera equipped with an optical viewfinder and a zoom viewfinder, Japanese Patent Laid-Open Publication No. 2003-283910 states that these viewfinders are suitably changed, and that the lens of the optical viewfinder system is driven in the state of being interlocked with the taking lens in order to ensure that the angle of view of the optical view finder coincides with that of the electronic viewfinder at the time of a change from the electronic viewfinder to the optical viewfinder.

Moreover, Japanese Patent Laid-Open Publication No. Hei 8-18842 states that in the case where the optical power of a multifocal lens is changed discontinuously, the electric zoom power is controlled so as to interpolate to obtain optical power other than that which is changed by the multifocal lens, and thereby zoom power is continuously changed in a manner similar to that in the case where a zoom lens is used.

All of the above-mentioned conventional techniques pertain to cameras each equipped with a single lens and a single image sensor, and do not pertain to a camera system equipped with a plurality of optical systems for photographing a scene. Consequently, the conventional techniques do not naturally teach how to change a plurality of optical systems.

A digital camera equipped with a fixed focal distance lens and a zoom lens as two lenses will now be considered. Settings of these two lenses are presumably changed as follows. That is, the focal distance gap between the focal distance of the fixed focal distance lens and the minimum focal distance of the zoom lens is interpolated by the electronic zoom of a digital image obtained by the fixed focal distance lens. Zoom setting means (a zoom button) for setting a zoom position is mounted on the camera, and a user can take a photograph in a desired zoom position by setting the zoom setting means to a wide setting or a telephoto setting. When the user sets the zoom setting means mounted on the camera to "telephoto," a digital image obtained by the fixed focal distance lens is electronically zoomed in. When the electronic zoom reaches the telescopic end of the electronic zoom, the electronic zoom is changed to the zoom lens for subsequent optical zooming. Moreover, when the user operates the zoom setting means and sets it to "wide," optical zoom-out of the digital image obtained by the zoom lens is performed. When the optical zoom down has reached the minimum focal distance of the zoom lens, the optical zoom-out is changed to the electronic zoom of the fixed focal distance lens, and subsequently the zoom-out of the fixed focal distance lens is performed.

An overlapping range can also be formed by extending the electronic zoom range of the fixed focal distance lens to the optical zoom range of the zoom lens, and either the electronic zoom or the optical zoom can be selected in the overlapping range. Because the electronic zoom is to perform the interpolation processing in order to extend a digital image obtained with an imaging device such as a CCD device or a CMOS device, the electronic zoom has a problem of deterioration in the image quality of the digital image. For this reason, using the optical zoom in the overlapping range is generally preferable. However, because the zoom power obtained by the optical zoom is discretely located when the optical zoom is driven discontinuously; i.e. stepwise, interpolation has to be performed by the electronic zoom between the discrete zoom positions of the optical zoom, which causes deterioration in image quality.

SUMMARY OF THE INVENTION

An object of the present invention is to provide an image apparatus capable of photographing at an angle of view desired by a user even when the optical zoom is driven stepwise and the zoom positions of the optical zoom are discrete, and capable of suppressing deterioration in image quality of a photographed image. According to the present invention, there is provided an imaging apparatus, comprising:

an imaging optical system that performs a step drive of an angle of view of a zoom;

an angle of view specifying unit for specifying the angle of view of the zoom;

a picture taking command unit for commanding photography; and a control unit for performing the step drive of an optical zoom of the imaging optical system in a direction of the specified angle of view when the picture taking command is performed to record a subject image using the imaging optical system at a time point of passing the specified angle of view.

Moreover, according to the present invention, there is provided an imaging apparatus, including:

a first imaging optical system including an electronic zoom range which constitutes at least a part of a zoom range;

a second imaging optical system being a step-drive-type optical zoom, wherein an angle of view range of the zoom at least partially overlaps an angle of view range of the zoom of the first imaging optical system;

an angle of view specifying unit for specifying the angle of view of the zoom, a picture taking command unit for performing picture taking command, and a control unit for performing, in a case where the angle of view specified by the angle of view specifying unit is located within the overlapping range, a step drive of the second imaging optical system in the specified angle of view direction to record a subject image at a time point of passing a set zoom position where the picture taking command is performed.

Moreover, according to the present invention, there is provided an imaging apparatus, comprising:

a first imaging optical system and a second imaging optical system, each performing a step drive of an angle of view of a zoom, wherein angle of view ranges of the zooms mutually overlap at least partially;

an angle of view specifying unit for specifying the angle of view of the zoom;

a picture taking command unit for performing picture taking command; and a control unit for performing, in a case where the angle of view specified by the angle of view specifying unit is located within the overlapping range, the step drive of either of the first imaging optical system and the second imaging optical system in a direction of the specified angle of view to record a subject image at a time point of passing the specified angle of view where the picture taking command is performed.

According to the present invention, even in an imaging apparatus in which the zoom of an imaging optical system is driven stepwise and a specified angle of view is located between discrete zoom angles of view, an image of an angle of view desired by a user can be obtained by performing photography at a time point when the imaging optical system passes the specified angle of view.

Moreover, by performing the photography as an optical zoom image, an image having an image quality superior to that of the electronic zoom image can be obtained.

DETAILED DESCRIPTION OF THE PREFERRED EMBODIMENTS

In the following, the preferred embodiment of the present invention is described by reference to the attached drawings.

Figure 1:
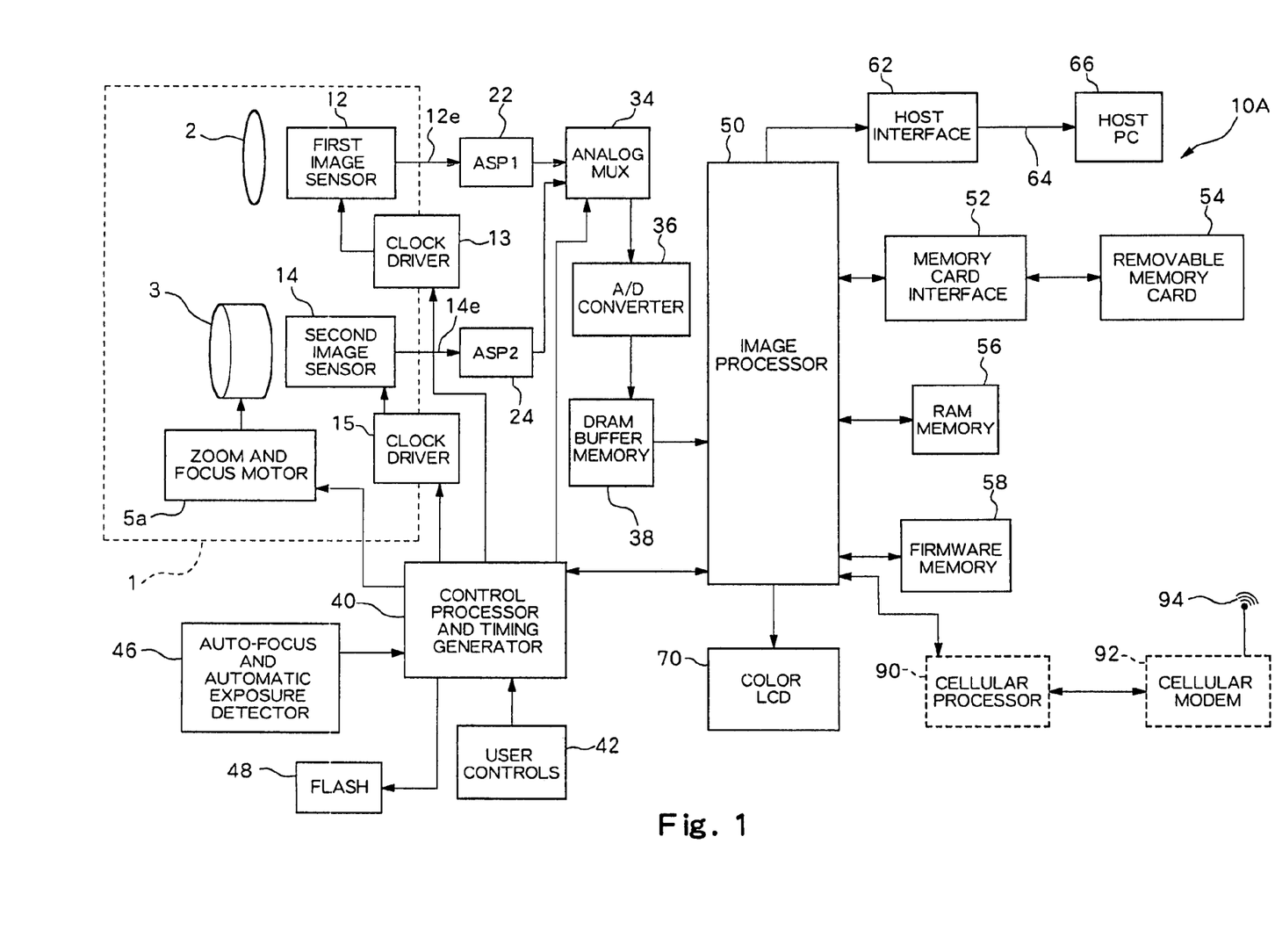
FIG. 1 is a block diagram showing the configuration of a digital camera.

FIG. 1 shows a block diagram showing the configuration of a digital camera 10A according to the present embodiment. The digital camera 10A is a portable battery-driven camera. The digital camera 10A generates the digital image of a still image to be stored in a removable memory card 54 which can be detached and attached freely. The digital camera 10A may generate the digital image of a moving image in addition to the still image, or as an alternative to the still image. The digital image of the moving image is similarly stored in the memory card 54.

The digital camera 10A includes an imaging assembly 1, and the imaging assembly 1 includes a fixed focal distance lens 2 imaging an image of a scene on a first image sensor 12, and a zoom lens 3 imaging an image of the scene on a second image sensor 14. The imaging assembly 1 provides a first image output 12e from the first image sensor 12 and a second image output 14e from the second image sensor 14. The image sensors 12 and 14 are identical in aspect ratio and pixel size. The lens 2 is an ultrawide-angle lens of 22 mm focal length for a 35 mm photography equivalent, and the zoom lens 3 is a zoom lens of 40 mm-120 mm focal length for the 35 mm photography equivalent.

The focal distance of the fixed focal distance lens 2 provides an ultrawide field of 22 mm, and the fixed focal distance lens 2 is focused on a subject located at a distance ranging from 4 feet to infinity. Consequently, the fixed focal distance lens 2 does not require any focusing. The fixed focal distance lens 2 includes an iris and a shutter assembly which control the exposure of the image sensor 12. The zoom lens 3 is driven by a zoom and focus motor 5a, and includes an iris and a shutter assembly which control the exposure of the image sensor 14.

Each of the image sensors 12 and 14 is a single-chip color mega pixel CCD sensor, and uses a known Bayer color filter for photographing a color image. The image sensors 12 and 14 have a 4:3 image aspect ratio, 3.1 effective mega pixels, and 2048 pixels×1536 pixels.

A control processor and timing generator 40 supplies a signal to a clock driver 13 to control the first image sensor 12, and supplies a signal to a clock driver 15 to control the second image sensor 14. The control processor and timing generator 40 also controls the zoom and focus motor 5a and a flash 48 for illuminating a scene. The control processor and timing generator 40 receives a signal from an auto-focus and automatic exposure detector 46. The image sensor 14 can be used in place of the auto-focus and automatic exposure detector 46 for exposure detection and TTL automatic focusing. User controls 42 are used for operation control of the digital camera 10A.

The first image output 12e from the first image sensor 12 is amplified by a first analog signal processor (ASP1) 22, and is supplied to a first input of an analog multiplexer (MUX) 34. The second image output 14e from the second image sensor 14 is amplified by a second analog signal processor (ASP2) 24, and is supplied to a second input of the analog MUX 34. The function of the analog MUX 34 is selecting either of the first image output 12e from the first image sensor 12 and the second image output 14e from the second image sensor 14, and thereby supplies the selected sensor output from the imaging assembly 1 to the subsequent stage.

The control processor and timing generator 40 controls the analog MUX 34 in order to supply the output of either the first analog signal processor (ASP1) 22 or the second analog signal processor (ASP2) 24 to an analog digital (A/D) conversion circuit 36. The digital data supplied from the A/D converter 36 is stored in a DRAM buffer memory 38, and is further processed by an image processor 50. The processing executed by the image processor 50 is controlled by firmware stored in a firmware memory 58 composed of a flash EPROM memory. The processor 50 processes an input digital image file, and the input digital image file is stored by a RAM memory 56 at a processing stage.

A configuration such that two A/D conversion circuits are connected to the outputs of the first analog signal processor (ASP1) 22 and the second analog signal processor (ASP2) 24, respectively, may be adopted, and in such a case the analog MUX 34 becomes unnecessary. Instead, a digital multiplexer is used for selecting either of the outputs of the A/D conversion circuits.

The digital image file processed by the image processor 50 is supplied to a memory card interface 52, and the interface 52 stores the digital image file to the removable memory card 54. The memory card 54 is a kind of a digital image storage medium, and can be used in different physical formats. For example, the memory card 54 can be applied to known formats such as Compact Flash, Smart Media, a memory stick, and MMC, SD, and XD memory card formats. Other formats, such as a magnetic hard drive, a magnetic tape, and an optical disc, can also be used. Alternatively, the digital camera 10A may use a built-in nonvolatile memory such as a Flash EPROM. In such a case, the memory card interface 52 and the memory card 54 are unnecessary.

The image processor 50 executes various housekeeping and image processing functions, including color interpolation by color correction and tone correction in order to generate sRGB image data. JPEG compression of the sRGB image data is next performed, and the compressed sRGB image data are stored in the memory card 54 as JPEG image data. The sRGB image data are also supplied to a host PC 66 via a host interface 62 of SCSI connection, USB connection, Fire Wire connection, or the like. A JPEG file uses the so-called "Exif" image format.

Although the image processor 50 is typically a programmable image processor, a hard-wired custom integrated circuit processor, a general purpose microprocessor, or a combination of the hard-wired custom IC and a programmable processor.

The image processor 50 also generates a low-resolution thumbnail image. After an image is photographed, a thumbnail image is displayed on a color LCD 70. A graphical user interface displayed on the color LCD 70 is controlled with the user controls 42.

The digital camera 10A may be included as part of a camera telephone (camera phone). In such an embodiment, the image processor 50 is connected to a cellular processor 90, and the cellular processor 90 uses a cellular modem 92 to transmit a digital image to a cellular network via an antenna 94, by means of wireless transmission. The imaging assembly 1 may be an integrated assembly including the lenses 2 and 3, the image sensors 12 and 14, and the zoom and focus motor 5a. In addition, the clock drivers 13 and 15, the analog signal processors 22 and 24, the analog MUX 34, and the A/D converter 36 may be included as a portion of the integrated assembly.

Figure 2A:
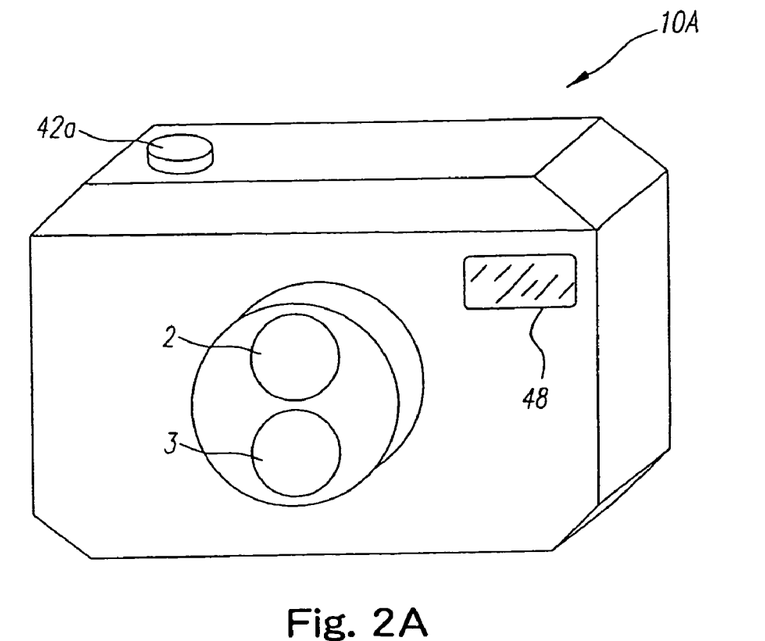
FIG. 2A is a front perspective view of the digital camera.
Figure 2B:
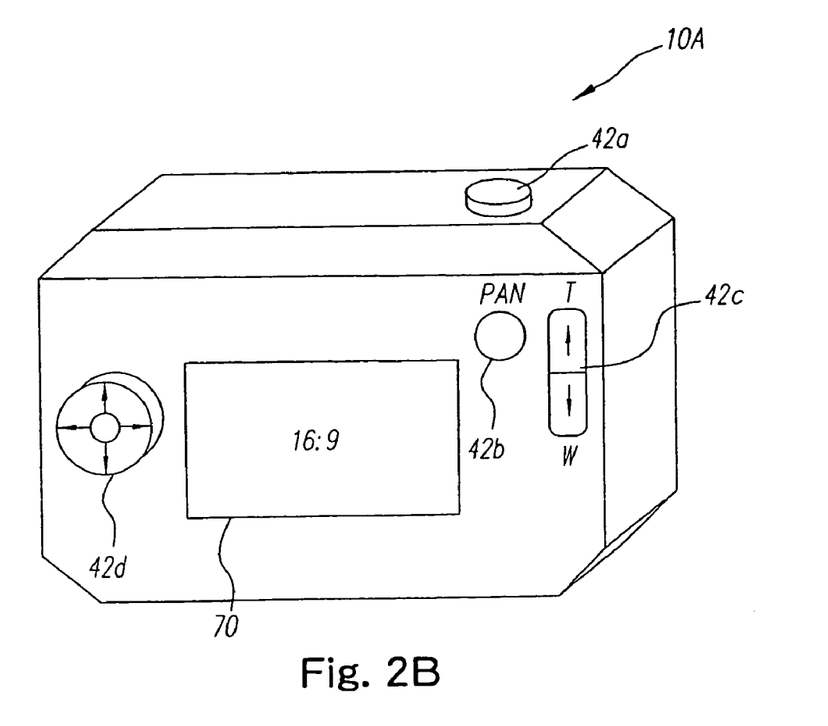
FIG. 2B is a rear perspective view of the digital camera.
Figure 6A:
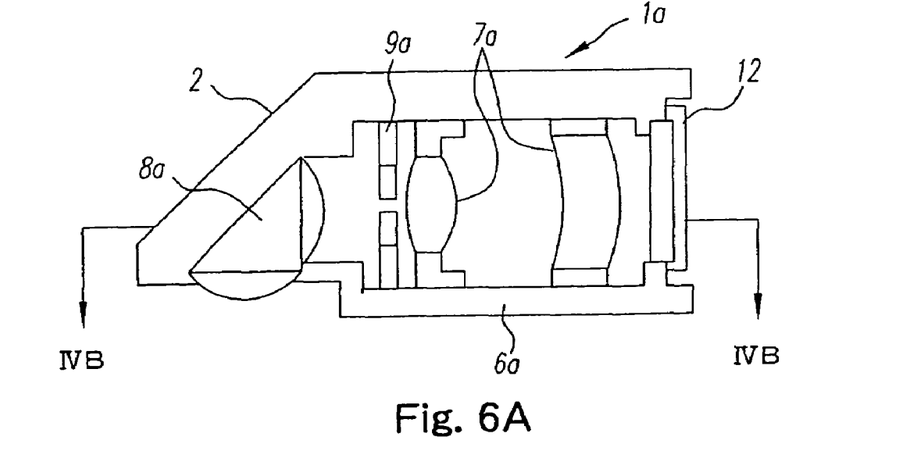
FIG. 6A is a plan view showing a bent optical system including a fixed focal distance lens.
Figure 6B:
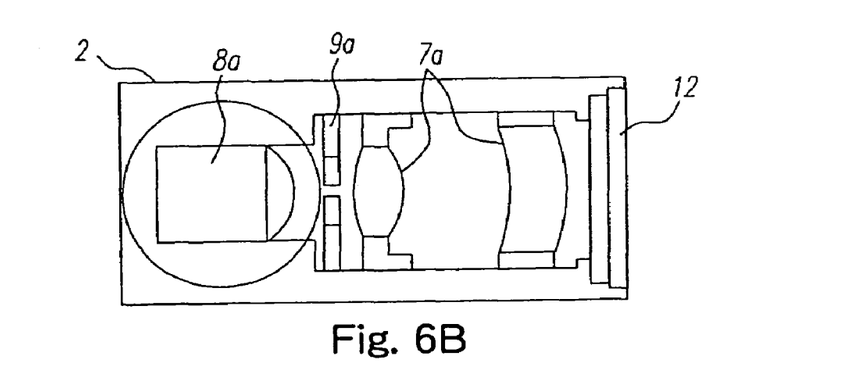
FIG. 6B is a front view showing the bent optical system including the fixed focal distance lens.

Perspective views of the digital camera 10A are shown in FIGS. 2A and 2B. FIG. 2A is a view showing the digital camera 10A as seen from the front thereof, and shows the fixed focal distance lens 2, the zoom lens 3, and the flash 48. The fixed focal distance lens 2 is an ultrawide-angle lens, and has a focal distance of 22 mm and a maximum iris of f/2. The zoom lens 3 is an ultrathin lens; i.e., a prism lens, and is a zoom lens of 40 mm-120 mm. The prism lens has a lens configuration as shown in FIGS. 6A and 6B, and includes prisms 8a and 8b for bent optical paths. Thereby, very thin optical configurations are produced. FIG. 2B is a view showing the digital camera 10A as seen from the rear thereof, and shows the color LCD 70 and the plurality of user controls 42. The user controls 42 include a shutter button 42a enabling a photographing sequence, a panorama button 42b enabling a panorama mode, a zoom button 42c enabling zoom setting, and a multi-position selector 42d for performing an operation through an image displayed on the color LCD 70 and menu selection.

The aspect ratio of an image obtained by the fixed focal distance lens 2 and the image sensor 12 may differ from the aspect ratio of an image obtained by the zoom lens 3 and the image sensor 14. For example, the image sensor 12 may be set so as to have an aspect ratio of 16:9 with 2730 pixels×1530 pixels and 4.2 effective mega pixels. The LCD 70 can be set to have a wide aspect ratio (for example, 16:9). The aspect ratio of the image sensor 12 corresponds to a panorama image (panorama image of 16:9), and the aspect ratio of the image sensor 14 corresponds to a typical television aspect ratio image (image of 4:3). In this case, the user controls 42 input a user command into the control processor and timing generator 40, and change the aspect ratio supplied from the image sensor 12 and stored, in order to obtain a variable panorama effect of narrowing the aspect ratio from that of the fixed focal distance lens (wide-angle lens) 2 to the aspect ratio of 4:3 of the zoom lens 3. The change is attained by cutting out the image data stored in the DRAM buffer memory 38, and only the midsection of the image data from the image sensor 12 is processed by the image processor 50 to be stored in the memory card 54. For example, when the wide control portion of the zoom button 42c is pressed, the vertical direction margin of an image is continuously adjusted to a wider aspect ratio from the normal aspect ratio of 16:9. In response to the adjustment, the upper end and the lower end of the image in the DRAM buffer memory 38 are cut off by the image processor 50, and wider aspect ratios such as 17:9, 18:9 (2:1), and 19:9 are generated. Alternatively, when the telephoto control portion of the zoom button 42c is pressed, the horizontal direction margin of an image is adjusted to a narrower aspect ratio from the aspect ratio of 16:9. In response to the adjustment, the left end and the right end of the image in the DRAM buffer memory 38 are cut off by the image processor 50, and narrower aspect ratios such as 15:9, 14:9, and 3:2 are generated. Thus, the variable panorama effect is digitally acquired on the basis of the image data from the first image sensor 12.

Figure 3:
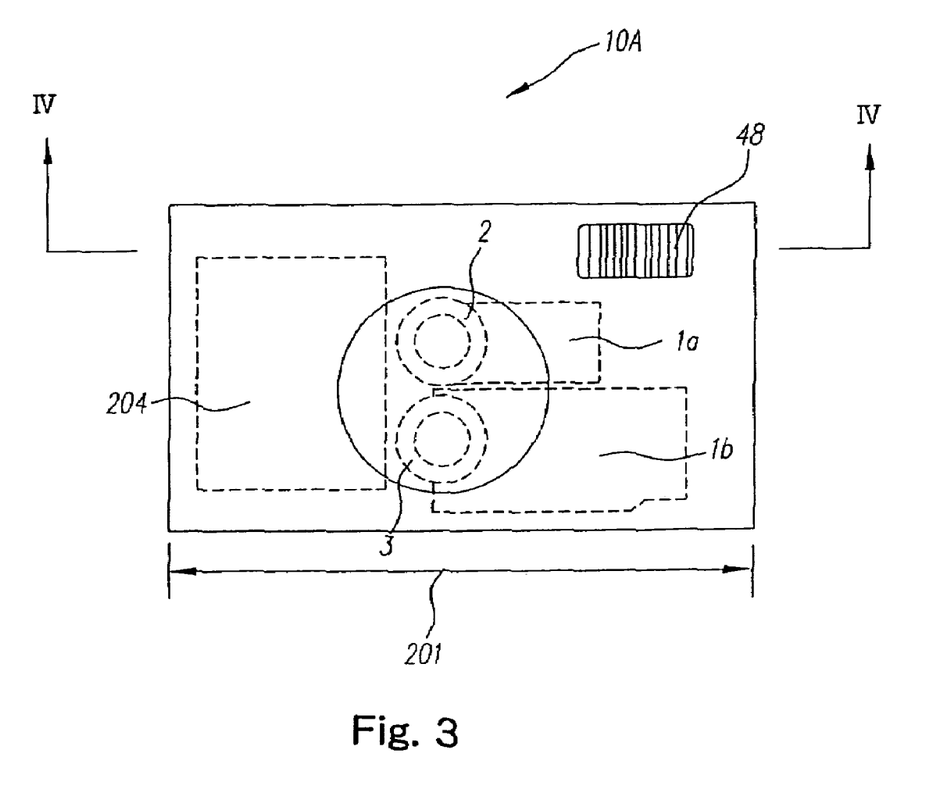
FIG. 3 is a front view of the digital camera.
Figure 4:
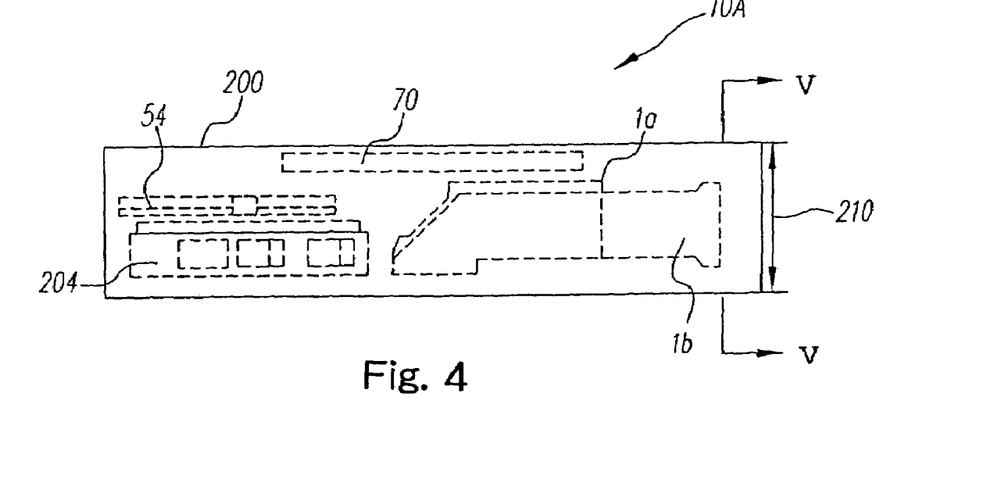
FIG. 4 is the plan view of the digital camera.
Figure 5:
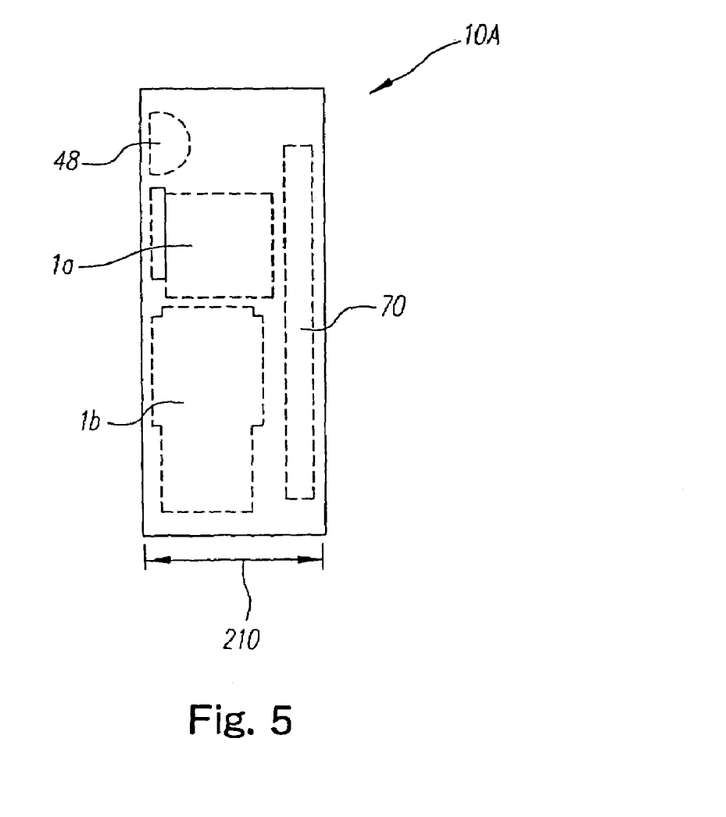
FIG. 5 is a side view of the digital camera.

FIGS. 3, 4, and 5 show the internal arrangement of the digital camera 10A. FIG. 3 is the front view of the digital camera 10A, and shows how a fixed focal distance lens subassembly 1a and a zoom lens subassembly 1b are located on one side of the lenses 2 and 3 and are located under the electronic flash 48. A battery unit 204 is located on the other side of the lenses 2 and 3. FIG. 4 is a plan, cross-sectional view of the digital camera 10A with respect to a line IV-IV of FIG. 3, and further shows the memory card 54 and the color LCD 70. FIG. 5 is a side, cross-sectional view of the digital camera 10A with respect to a line V-V of FIG. 4, and further shows the vertical direction positions of the fixed focal distance lens subassembly 1a, the zoom lens subassembly 1b, and the flash 48. The most noteworthy feature is that adoption of the bent optical systems of the subassembly systems 1a and 1b enables the imaging assembly 1 to be contained in a compact 210 from the front of the camera 10A to the rear thereof.

FIGS. 6A and 6B show an optical relay subassembly 1a supporting the fixed focal distance lens 2 in relation to the image sensor 12 along the bent optical path. FIG. 6A shows a lens barrel 6a supporting an object lens of the fixed focal distance lens 2, the image sensor 12, and relay lens parts 7a on an optical path bent by a mirror prism 8a. In addition, the lens barrel 6a supports an iris shutter assembly 9a on the optical path. FIG. 6B is a view taken along a line VIB-VIB in FIG. 6A, showing the external appearance of the optical subassembly 1a as seen from the front of the camera.

Figure 7:
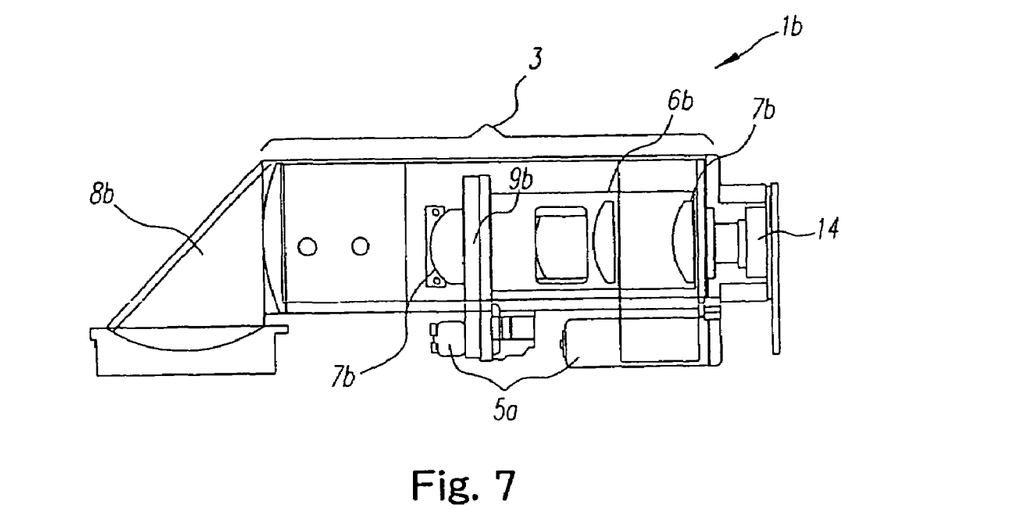
FIG. 7 is a plan view showing the bent optical system including a zoom lens.

FIG. 7 shows an optical relay subassembly 1b supporting the zoom lens 3 in relation to the image sensor 14 along a bent optical path. The subassembly 1b includes the object lens of the zoom lens 3, the second image sensor 14, and a fixture 6b supporting movable relay (zoom) lens parts 7b on the optical path bent by a mirror prism 8b. The fixture 6b supports an iris shutter assembly 9b on the optical path. The movements of the lens parts 7b are controlled by the zoom and focus motor 5a.

In such a configuration, fundamental operation is performed as follows. When the digital camera 10A is turned on by means of a power switch, the zoom lens 3 is set at a default position. The default position is suitably the wide end; i.e., the minimum focal distance $II_{ow}$ of the zoom lens 3. When a user pushes the panorama button 42b, the control processor and timing generator 40 controls the analog MUX 34 to use the analog signal processor (ASP1) 22 for supplying the output of the first image sensor 12 to the A/D converter 36. Then, a preview image from the image sensor 12 is displayed on the LCD 70. When the zoom button is operated at this point, the electronic zoom of the fixed focal distance lens (wide angle lens) 2 is executed. Next, when the shutter button 42a is pushed, a still image is photographed by use of the output of the first sensor 12, and the photographed image is stored in the memory card 54.

When the user does not push the panorama button 42b, the control processor and timing generator 40 controls the analog multiplexer 34 to use the second analog signal processor (ASP2) 24 for supplying the output of the second image sensor 14 to the A/D converter 36. Then, the preview image from the second image sensor 14 is displayed on the LCD 70. When the zoom button is operated at this point, the position of the zoom lens is adjusted, and the zoom effect from the wide end of the zoom lens 3 to the telephoto end thereof is acquired. Next, when the shutter button is pushed, a still image is photographed by use of the output of the second image sensor 14.

In contrast, when the user pushes the panorama button 42b to obtain a digital image from the first image sensor 12, and subsequently the user continues operating the "telephoto" side of the zoom button 42c, or in the case where, because the user does not operate the panorama button 42b, a digital image from the second image sensor 14 is acquired, and the user continues operating the "wide" side of the zoom button 42c, a change between the two optical systems arises. In the present embodiment, an electronic zoom range 700 of the fixed focal distance lens 2 and an optical zoom range 800 of the zoom lens 3 are set so that they may partially overlap.

Figure 8:
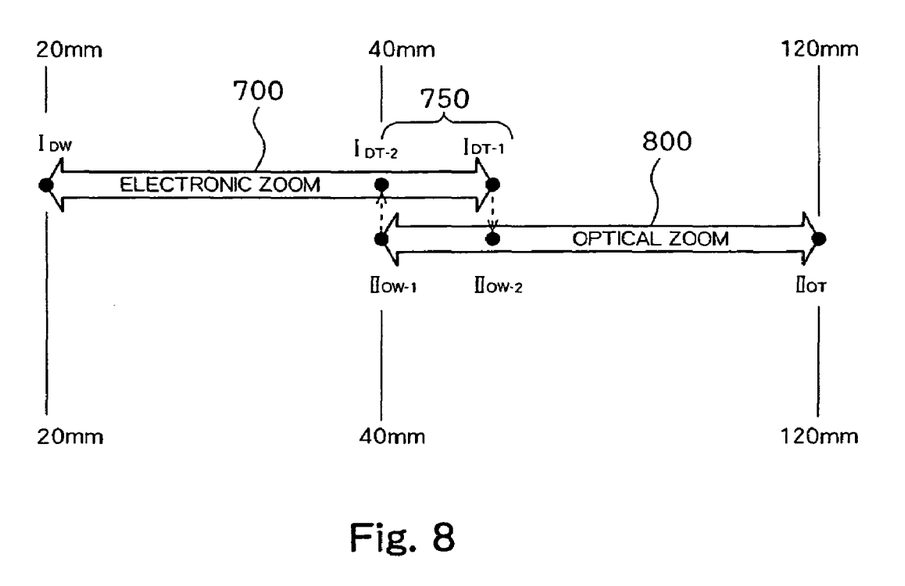
FIG. 8 is a diagram showing a relation between the electronic zoom range of the fixed focal distance lens and the optical zoom range of the zoom lens in an embodiment.

The electronic zoom range 700 of the fixed focal distance lens 2 and the optical zoom range 800 of the zoom lens 3 of the present embodiment are shown in FIG. 8. The electronic zoom range 700 of the fixed focal distance lens 2 does not only simply fill up the focal distance gap between the focal distances of the fixed focal distance lens 2 and the zoom lens 3, but also partially overlaps the zoom range 800 of the zoom lens 3 to form an overlapping range 750. When $I_{DW}$ denotes the wide end of the electronic zoom range 700 of the fixed focal distance lens 2, $I_{DT-1}$ the telephoto end thereof, $II_{OW-1}$ the wide end of the optical zoom range 800 of the zoom lens 3, and $II_{OT}$ the telephoto end thereof, $I_{DW}$ is located at the wider side in relation to $II_{OW-1}$, and $I_{DT-1}$ is located at the wider side in relation $II_{OT}$ and more towards the telephoto side than $II_{OW-1}$.

At the time of transiting from the wide side to the telephoto side, the change can be performed at an arbitrary position within the overlapping range 750. For example, the change can be performed at the telephoto end $I_{DT-1}$ of the electronic zoom range 700. Moreover, also at the time of transiting from the telephoto side to the wide side, the change can be performed at an arbitrary position within the overlapping range 750. For example, a change can be performed at the wide end $II_{OW-1}$ of the optical zoom range 800.

The zoom and focus motor 5a drives the zoom lens 3 stepwise, or discretely. Consequently, the optical zoom range 800 of the zoom lens 3 is also not continuous, but stepwise or discrete. This situation is satisfactory when the zoom position set by the user operating the zoom button 42c coincides with a discrete optical zoom position of the zoom lens 3. However, when the zoom position set by the user does not coincide with any discrete optical zoom positions of the zoom lens 3; namely, when the zoom button 42c can set a zoom position (angle of view) continuously or at a width finer than the step width of the optical zoom of a zoom lens 3 and the zoom position (angle of view) which the user set exists between the discrete optical zoom positions, the compensation of zoom can be performed by the electronic zoom of the fixed focal distance lens 2. As already described, the image obtained by the electronic zoom causes deterioration in image quality. Accordingly, in the present embodiment, when the zoom position which the user set is located within the overlapping range 750 and it exists between discrete optical zooms, photographing is performed by using both the fixed focal distance lens 2 and the zoom lens 3.

Incidentally, when the zoom position which the user set is located only within the electronic zoom range 700, photographing is performed by executing the electronic zoom. When the zoom position is located only within the optical zoom range 800, photographing is performed at the step nearest the set zoom position among the zoom positions of the optical zoom. Even when the zoom position which the user set is located only within the optical zoom range 800, a photograph may be taken at a time point when the optical zoom passes the specified zoom position, as described below.

Figure 9A:
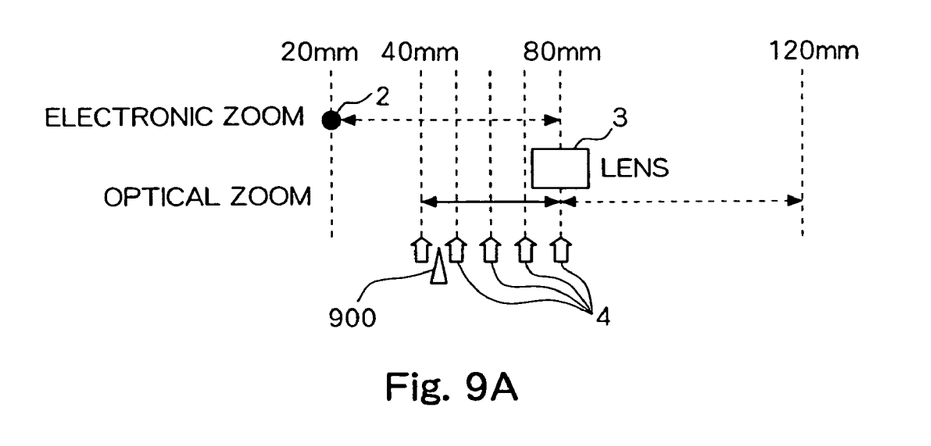
FIG. 9A is a diagram showing a relation between the electronic zoom, the optical zoom, and a user's setting zoom position.
Figure 9B:
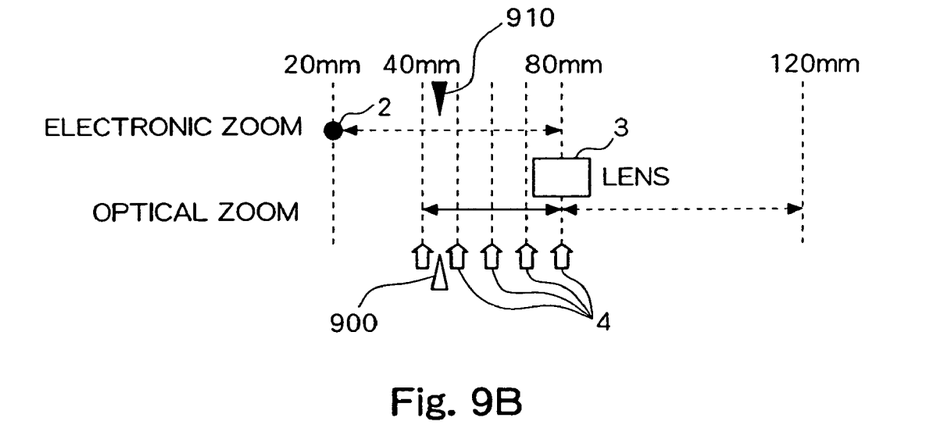
FIG. 9B is a diagram showing the state in which the electronic zoom position is set at the user's setting zoom position in FIG. 9A.
Figure 9C:
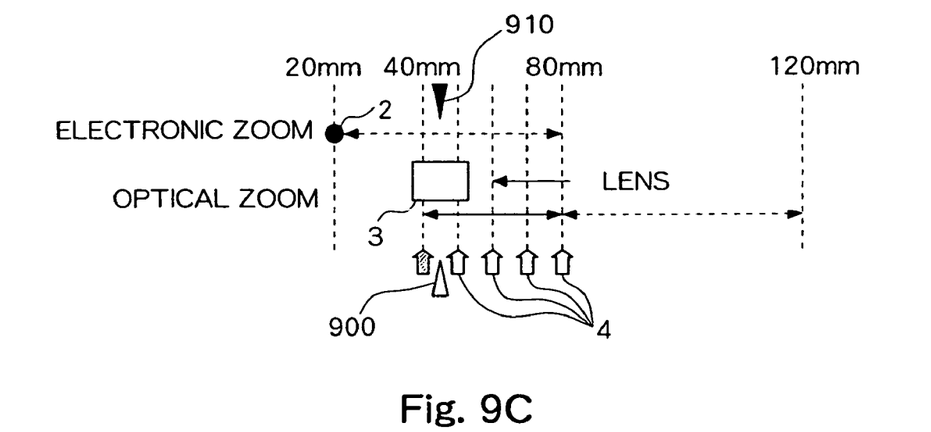
FIG. 9C is a diagram showing a movement state of the optical zoom after the electronic zoom.

FIGS. 9A, 9B, and 9C show the electronic zoom of the fixed focal distance lens 2 and the optical zoom of the zoom lens 3 when the user sets the zoom button 42c on the "wide" side. Incidentally, the focal distance of the fixed focal distance lens 2 and the focal distance of a zoom lens 3 are schematically shown in these figures. Moreover, the overlapping range 750 of the electronic zoom range 700 and the optical zoom range 800 is set to 40 mm-80 mm, for example.

FIG. 9A depicts a case where the user operates the zoom button 42c to the "wide" side and sets a zoom position at a focal distance of about 45 mm. In the figure, reference numeral 900 indicates the zoom position set by the user. The zoom lens 3 is supposed to be set at a zoom position of a focal distance of 80 mm. At this time, because the drive speed of electronic zoom is faster than the drive speed of the optical zoom, the control processor and timing generator 40 selects the output of the first image sensor 12, and supplies it to the image processor 50. The image processor 50 performs the zoom of the digital image from the first image sensor 12 electronically, and displays it on the LCD 70.

FIG. 9B shows a case where the electronic zoom is performed. In the figure, reference numeral 910 indicates the zoom position of the electronic zoom. This electronic zoom position coincides with the zoom position set by the user. Because an image having been received as a result of electronic zoom of the digital image obtained by the first image sensor 12 is displayed on the LCD 70, the angle of view of the image is the one which the user intended. However, the image quality thereof is inferior. When the user operates the shutter button 42a in this state, an electronic zoom image is stored in the memory card 54. In the present embodiment, the control processor and timing generator 40 obtains an optical zoom image in place of the electronic zoom image, or in combination with the electronic zoom image, and stores the obtained images in the memory card 54.

FIG. 9C shows the drive state of the zoom lens 3 after the electronic zoom is performed. The zoom and focus motor 5a drives the zoom lens 3 towards the zoom position 900 set by the user in accordance with a command from the control processor and timing generator 40. The zoom lens 3 is driven discretely. In the figure, reference numeral 4 indicates discrete zoom positions of the zoom lens 3. Although the zoom lens 3 cannot be stopped at the user's setting zoom position 900, it passes through the user's setting position 900. The control processor and timing generator 40 supplies the digital image obtained by the second image sensor 14 to the image processor 50 at the point of time when the zoom lens 3 passes the user's setting zoom position 900, and the image processor 50 processes the digital image to store the digital image in the memory card 54. Consequently, although an electronic zoom image is displayed on the LCD 70, the image which is photographed and is stored in the memory card 54 is an optical zoom image only, or the electronic zoom image and the optical zoom image.

Figure 13:
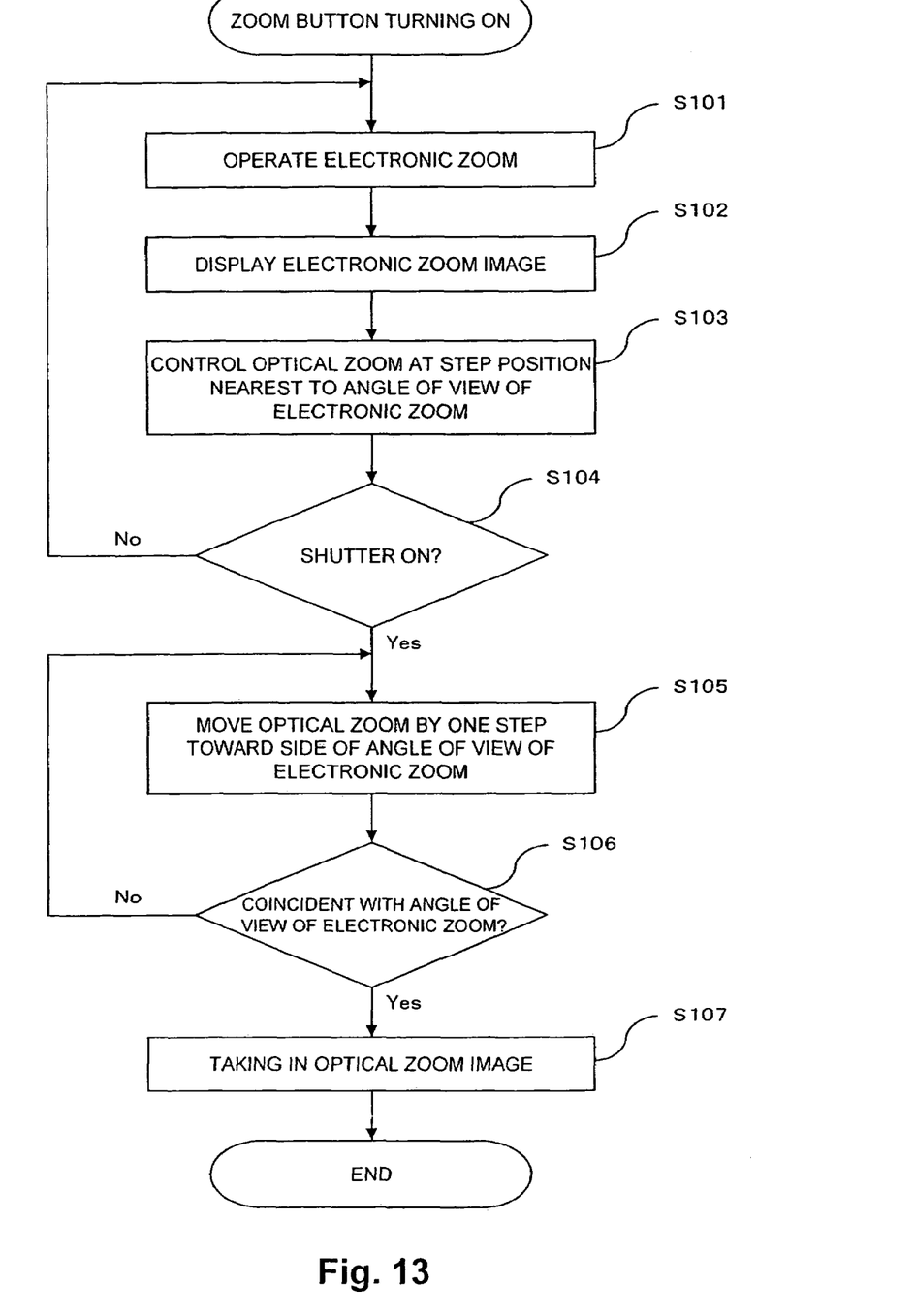
FIG. 13 is a flowchart showing the processing of the embodiment.

FIG. 13 shows a flowchart of the above-mentioned processing. When a user operates the zoom button 42c (zoom button turning on), the control processor and timing generator 40 and the image processor 50 make the electronic zoom of the fixed focal distance lens 2 operate (S101), and display the image obtained, by expanding the image of the first image sensor 12 electronically on the LCD 70 (S102). The user can confirm the desired angle of view on the LCD 70. On the other hand, the control processor and timing generator 40 drives the zoom and focus motor 5a to control the optical zoom of the zoom lens 3 to be located at a step position nearest the zoom position (angle of view) of the electronic zoom among the step positions of the zoom lens 3 (S103). Then, the control processor and timing generator 40 and the image processor 50 judges whether or not the shutter button has been operated, and stands by in this state (S104). When the shutter button is operated, the control processor and timing generator 40 moves the optical zoom of the zoom lens 3 from the standby position to the side of the angle of view of the electronic zoom of the fixed focal distance lens 2 by only one step (S105). Then, when the angle of view of the optical zoom coincides with the angle of view of the electronic zoom (YES in S1106), the control processor and timing generator 40 stores the image of the optical zoom; i.e., the image obtained by the second image sensor 14, in the memory card 54 (S107).

Although the above pertains to the case where the user operates the zoom button 42c to the "wide" side the same processing is applicable to the case where the zoom button 42c is operated to the "telephoto" side.

Figure 10:
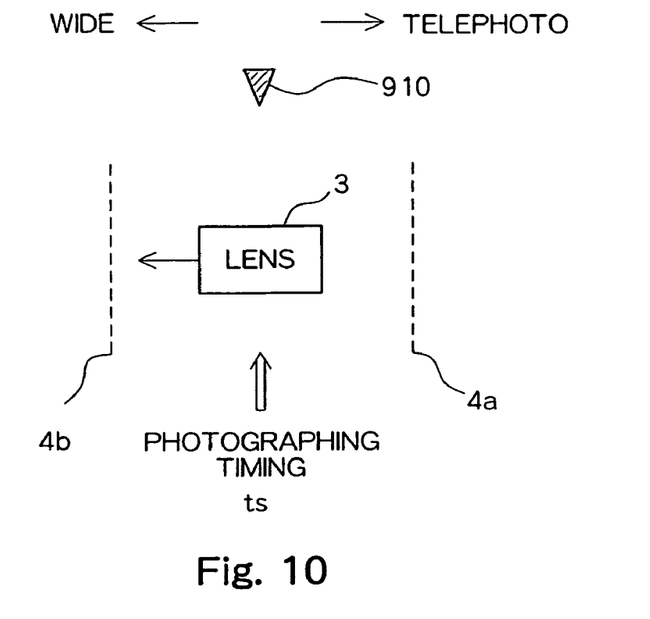
FIG. 10 is a diagram showing photographing timing in the optical zoom.

FIG. 10 shows the optical zoom position near the user's setting zoom position 900 (namely, an electronic zoom position 910). Although the zoom lens 3 can stop at discrete zoom positions 4a and 4b, the zoom lens 3 cannot stop at the user's setting zoom position 900 between the discrete zoom positions 4a and 4b, but passes through the user's setting zoom position 900. The zoom and focus motor 5a maintains unchanged the focus at the time point when the zoom lens 3 has reached the zoom position 4a just before the user's setting zoom position 900, and drives the zoom lens 3 to the zoom position 4b just behind the user's setting zoom position 900. The control processor and timing generator 40 stores in the memory card 54 the digital image from the second image sensor 14 at the time point when the zoom lens 3 has passed the user's setting zoom position (the photographing timing ts shown in the figure). After the zoom lens 3 has taken a photograph when it passes the user's setting zoom position 900, the zoom and focus motor 5a stops the zoom lens 3 at the zoom position 4b just behind the user's setting zoom position 900. When the user operates the zoom button 42c to the "telephoto" side, the zoom and focus motor 5a maintains unchanged the focus at the zoom position 4b just before the user's setting zoom position 900, and the zoom lens 3 takes a photograph at the user's setting zoom position 900. Then, the zoom and focus motor 5a stops the zoom lens 3 at the zoom position 4a just behind the user's setting zoom position 900.

Figure 11:
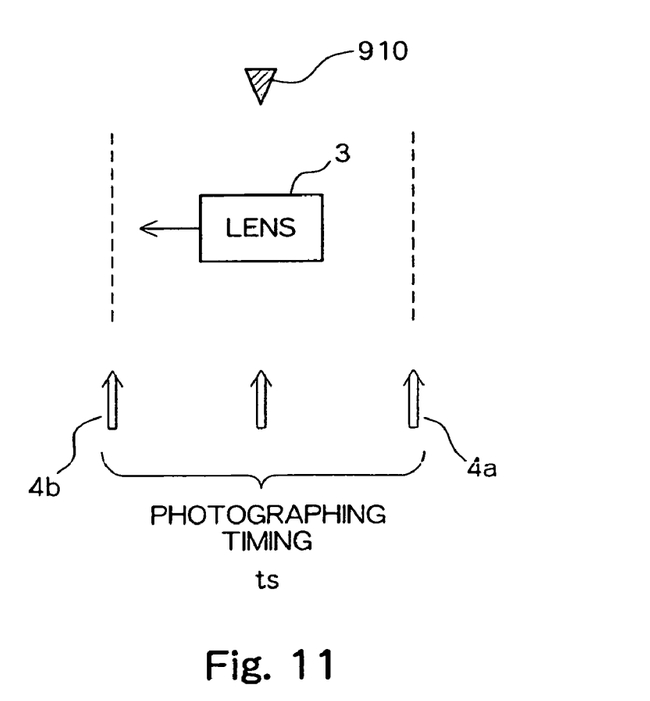
FIG. 11 is a diagram showing the photographing timing at the time of auto zoom bracketing photography.

FIG. 11 shows the optical zoom positions near the user's setting zoom position 900 in another embodiment. In FIG. 10, the time point when the zoom lens 3 has passed the user's setting zoom position 900 is set as the photographing timing ts. FIG. 11 shows the case where auto bracketing photography is performed. Usually, by auto bracketing photography, a subject is continuously photographed at an exposure corrected to be under the exposure considered to be proper and at an exposure corrected to be over to the exposure considered to be proper. A user can select the image of favorite exposure from the images photographed at the different exposures. In FIG. 11, a plurality of optical zoom images which do not differ in exposure but differ in zoom position (angle of view) is photographed. The zoom and focus motor 5a discretely drives the zoom lens 3 toward the user's setting zoom position 900. The zoom and focus motor 5a stops the zoom lens 3 at the time point when the zoom lens 3 reaches the zoom position 4a just before the user's setting zoom position 900, and first stores an electronic zoom image in a memory. Then, the zoom lens 3 photographs a subject. Subsequently, the zoom and focus motor 5a again drives the zoom lens 3, and the zoom lens 3 photographs the subject when the zoom lens 3 passes the user's setting zoom position 900. After that, when the zoom lens 3 reaches the zoom position 4b just behind the user's setting zoom position 900, the zoom and focus motor 5a stops the zoom lens 3, and the zoom lens 3 photographs the subject (three times of photographing timing ts are shown in the figure). In the manner described above, by a time the user operates the shutter button 42a and operates the zoom button 42c, three images of different zoom positions are obtained, and the obtained images are stored in the memory card 54 (auto zoom bracketing photography). In the meantime, an electronic zoom image is displayed on the LCD 70. Thereby, the images which are shifted from each other in time can be taken in, and the images can be compared and selected.

Although FIG. 11 depicts three timings for obtaining images; i.e., the user's setting zoom position, the discrete zoom position 4a just before the user's setting zoom position 900, and the discrete zoom position 4b just behind the user's setting zoom position 900, the user may suitably set an arbitrary photographing number in the ordinal auto bracketing photography.

Figure 12:
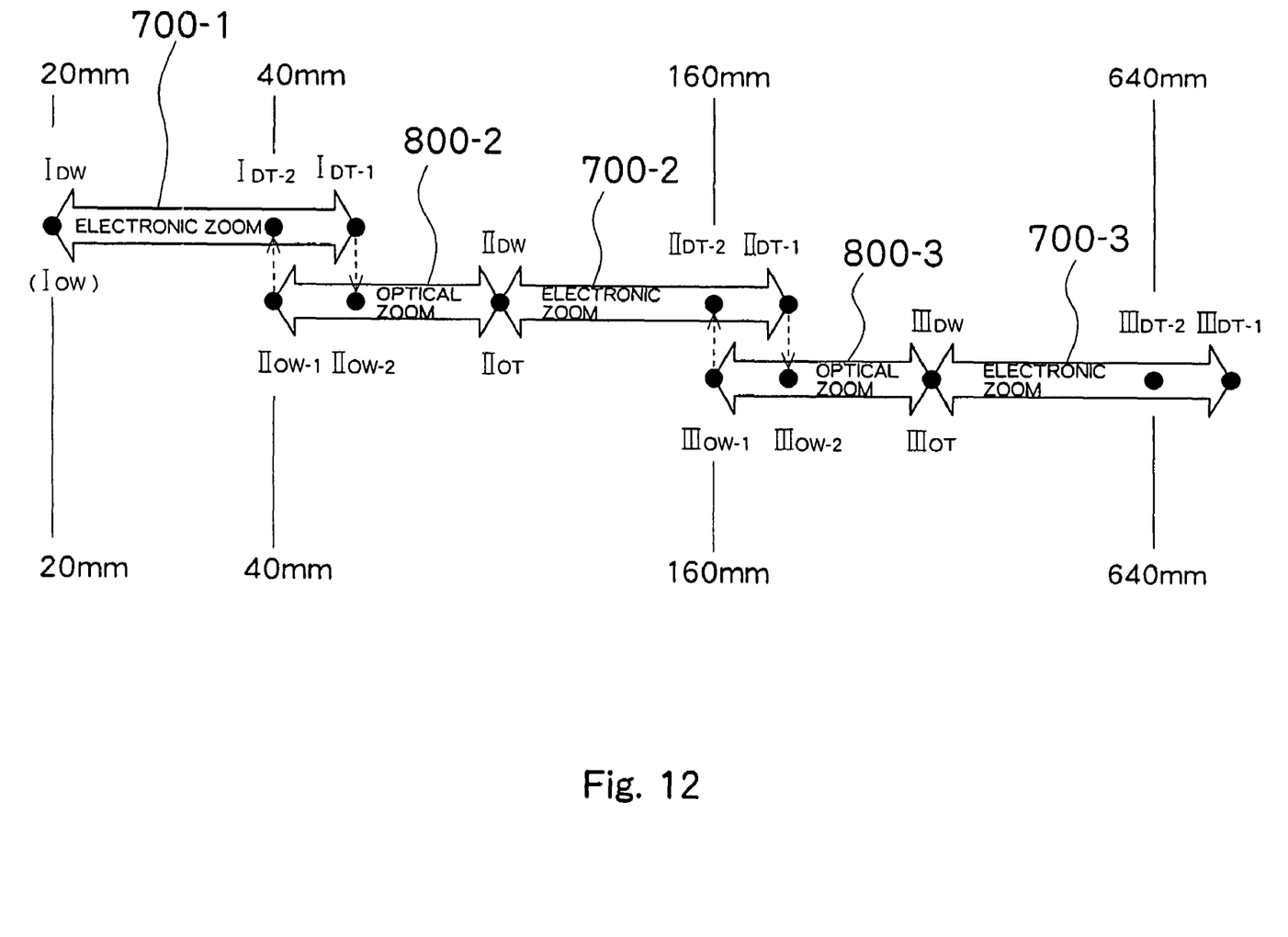
FIG. 12 is a diagram showing a relation between the electronic zoom and the optical zoom of a digital camera including three imaging optical systems.

FIG. 12 shows optical zoom ranges 800-2, 800-3 of each zoom lens and electronic zoom ranges 700-1, 700-2, and 700-3 in the case where one fixed focal distance lens and two zoom lenses are mounted on the digital camera 10A. The digital camera shown in FIG. 12 is that obtained by further adding a third zoom lens to the digital camera 10A equipped with the two imaging optical systems shown in FIG. 1 in order to equip the digital camera 10A with three imaging optical systems. The first lens is a fixed focal distance lens of 20 mm, and has the first electronic zoom range 700-1. The second lens is a zoom lens of 40 mm-80 mm, and has the second optical zoom range 800-2 and the second electronic zoom range 700-2. The third lens is a zoom lens of 160 mm-320 mm, and has the third optical zoom range 800-3 and the third electronic zoom range 700-3. The relation between the first electronic zoom range 700-1 of the first lens and the second optical zoom range of the second lens is the same as that, mentioned above, between the electronic zoom range 700 of the fixed focal distance lens 2 and the optical zoom range 800 of the zoom lens 3. The same applies to the relation between the second electronic zoom range 700-2 of the second lens and the third optical zoom range 800-3 of the third lens, and the two zoom ranges are set so that they may partially overlap. That is, the telephoto end of the second electronic zoom range 700-2 of the second lens is towards the telephoto side in relation to the wide end of the third optical zoom range 800-3 of the third lens, and is toward the wide side in relation to the telephoto end of the third optical zoom range 800-3. Moreover, the wide end of the second electronic zoom range 700-2 of the second lens is located toward the wide side in relation to the wide end of the third optical zoom range 800-3 of the third lens. When the zoom position set by the user exists within the overlapping range of the second electronic zoom range and the third optical zoom range, an image is first acquired by the electronic zoom, as in the above-mentioned embodiment, to be displayed on the LCD 70. Subsequently, the optical zoom is discretely driven. When the zoom lens 3 passes the corresponding zoom position, a photograph is taken. Then, the obtained image is stored in the memory card 54.

Although an embodiment of the present invention has been described above, the present invention is not limited to these modes, and other modes are also adoptable.

For example, although the present embodiment has exemplified a digital camera which has two imaging optical systems or three imaging optical systems, the present invention may be applied to a digital camera which has a single imaging optical system. Such a digital camera is equipped with only a single zoom lens, and has an electronic zoom function and an optical zoom function. The optical zoom is discretely driven by the focus and zoom motor. The zoom position set by the user is located between the discrete zoom positions, and the electronic zoom is first set as the user's setting zoom position to be displayed on the LCD 70. After that, the optical zoom is driven. Then, the focus at the discrete zoom position just before the user's setting zoom position is maintained. When the optical zoom passes the user's setting zoom position, a photograph is taken. The image obtained by the photographing is stored in the memory card 54. After that, the optical zoom position of the zoom lens stops at the discrete zoom position just behind the user's setting zoom position. The present invention may be applied to a digital camera having only a single zoom lens and having only the optical zoom function. Without performing the electronic zoom, the image obtained by the optical zoom is displayed in an optical viewfinder, and photographing is performed at the time when the optical zoom passes the user's setting zoom position.

Moreover, although in the present embodiment the electronic zoom image is displayed on the LCD 70 and the optical zoom image is acquired with the display being maintained to be stored in the memory card 54, the following modes are possible.

(1) Displaying an electronic zoom image on the LCD 70, and storing in the memory card 54 only the optical zoom image obtained by photographing.

(2) Displaying an electronic zoom image on the LCD 70, and storing in the memory card 54 the electronic zoom image and the optical zoom image which have been obtained by photographing.

(3) Displaying an electronic zoom image on the LCD 70, and storing in the memory card 54 the optical zoom image obtained by photographing to be displayed on the LCD 70 in place of the electronic zoom image.

Moreover, although a photograph is taken at the user's setting zoom position 900, the discrete zoom position 4a, and the discrete zoom position 4b in FIG. 11, the photograph may be taken twice in total, at the user's setting zoom position 900 and the discrete zoom position 4a, or at the user's setting zoom position 900 and the discrete zoom position 4b. Furthermore, an image in which the zoom position has been shifted by the set number of photos to the wide side or to the telephoto side including the user's setting zoom position 900 may be obtained. Moreover, although in the present embodiment the fixed focal distance lens 2 is used, both of the two optical systems may be used as the zoom lenses.

Moreover, although the present embodiment is configured so that the user operates the zoom button 42c to specify the angle of view and operates the shutter button 42a to input a photography command, there may be adopted a configuration in which the angle of view and the shutter are controlled in accordance with the signals from another control unit.

PARTS LIST

1 Imaging Assembly
1a Fixed Focal Distance Lens Subassembly
1a Optical Relay Subassembly
1b Zooms Lens Subassembly
2 Fixed Focal Distance Lens
2 Lens
3 Zoom Lens
4a Zoom Positions
4b Zoom Positions
5a Focus Motor
6a Lens Barrel
6b Fixture
7a Relay Lens Parts
7b Zoom Lens Parts
8a Mirror Prism
8b Mirror Prism
9a Iris Shutter Assembly
9b Iris Shutter Assembly
10a Digital Camera
12 First Image Sensor
12e First Image Output
13 Clock Driver
14 Second Image Sensor
14 Image Sensor
14e Second Image Output
15 Clock Driver
22 First Analog Signal Processor (ASP1)
24 Second Analog Signal Processor (ASP2)
34 Analog Multiplexer (MUX)
36 Analog Digital (A/D)
38 DRAM Buffer Memory
40 Timing Generator
40 Timing Generator
42 User Controls
42a Shutter Button
42b Panorama Button
42c Zoom Button
42d Multi-Position Selector
46 Automatic Exposure Detector
48 Flash
48 Electronic Flash
50 Image Processor
52 Memory Card Interface
54 Memory Card
56 RAM Memory
58 Firmware Memory
62 Host Interface
66 Host PC
70 Color LCD
90 Cellular Processor
92 Cellular Modem
94 Antenna
204 Battery Unit
210 Compact
700 Electronic Zoom Range
750 Overlapping Range
800 Optical Zoom Range
900 Zoom Position
910 Electronic Zoom Position

What is claimed:

1. An imaging apparatus, comprising:
an imaging optical system that performs step drive of an angle of view of a zoom;
angle of view specifying means for specifying the angle of view of the zoom;
commanding means for issuing a command to take a picture;
control means for performing the step drive of an optical zoom of said imaging optical system in a direction of the specified angle of view when the picture taking command is performed to record a subject image by use of said imaging optical system at a time point of passing the specified angle of view
said angle of view specifying means is means for specifying an angle of view continuously or at a width finer than a width of the step drive, and
said control means controls step positions of said imaging optical system so as to follow a neighborhood of the specified angle of view and performs the step drive of the optical zoom of said imaging optical system in the direction of the specified angle of view from a step position near the optical zoom of said imaging optical system when the picture taking command is performed for recording the subject image at a time point of passing the specified angle of view.

2. The imaging apparatus according to claim 1, further comprising display means for displaying a zoom image in accordance with the specified angle of view.

3. The imaging apparatus according to claim 1, further comprising means for generating an electronic zoom image in accordance with the specified angle of view, wherein said display means displays the electronic zoom image.

4. The imaging apparatus according to claim 1, wherein said control means records the subject image also at a step position near the specified angle of view.

5. The imaging apparatus according to claim 1, further comprising display means for displaying a zoom image in accordance with the set angle of view.

6. The imaging apparatus according to claim 5, further comprising means for generating an electronic zoom image in accordance with the set angle of view, wherein said display means displays the electronic zoom image.

7. An imaging apparatus, comprising:
a first imaging optical system including an electronic zoom range constituting at least a part of a zoom range;
a second imaging optical system being a step-drive-type optical zoom, wherein an angle of view range of said zoom at least partially overlaps an angle of view range of the electronic zoom of said first imaging optical system;
angle of view specifying means for specifying the angle of view of said zoom,
picture taking command means for performing picture taking command, and
control means for performing, in a case where the angle of view specified by said angle of view specifying means is located within the overlapping range, a step drive of said second imaging optical system in the specified angle of view direction to record a subject image at a time point of passing a set zoom position when the picture taking command is performed.

8. The imaging apparatus according to claim 7, wherein a wide end of said first imaging optical system is set to be wider than a wide end of said second imaging optical system.

9. The imaging apparatus according to claim 7, wherein said angle of view specifying means is means for specifying an angle of view continuously or at a width finer than a width of the step drive, and
said control means controls step positions of said second imaging optical system so as to follow a neighborhood of the specified angle of view when the angle of view of the electronic zoom is specified in the overlapping range, and performs the step drive in the direction of the specified angle of view from the neighborhood step position to record the subject image at a time point of passing the set angle of view when the picture taking command is performed.

10. The imaging apparatus according to claim 7, wherein said control means records the subject image also at a step position near the specified angle of view.

11. An imaging apparatus, comprising:
a first imaging optical system and a second imaging optical system, both performing a step drive of an angle of view of a zoom, wherein angle of view ranges of the zooms at least partially overlap;
angle of view specifying means for specifying the angle of view of the zoom;
picture taking command means for performing picture taking command; and
control means for performing, in a case where the angle of view specified by said angle of view specifying means is located in the overlapping range, the step drive of either of said first imaging optical system and said second imaging optical system in a direction of the specified angle of view to record a subject image at a time point of passing the specified angle of view when the picture taking command is performed.

12. The imaging apparatus according to claim 11, wherein said control means drives the one of said first imaging optical system and said second imaging optical system located at a position nearer to the specified angle of view to record the subject image.

* * * * *